United States Patent [19]

Maruyama et al.

[11] 4,363,047

[45] * Dec. 7, 1982

[54] ROTARY HEAD ASSEMBLY FOR MAGNETIC RECORDING AND REPRODUCING DEVICE

[75] Inventors: Teruo Maruyama, Neyagawa; Takashi Ichiyanagi, Hirakata, both of Japan

[73] Assignee: Matsushita Electric Industrial Co., Ltd., Tokyo, Japan

[*] Notice: The portion of the term of this patent subsequent to Feb. 17, 1998, has been disclaimed.

[21] Appl. No.: 201,737

[22] Filed: Oct. 29, 1980

Related U.S. Application Data

[63] Continuation of Ser. No. 4,564, Jan. 18, 1979, Pat. No. 4,251,840.

[30] Foreign Application Priority Data

Jan. 27, 1978 [JP] Japan ................................. 53-8741

[51] Int. Cl.³ .............................................. G11B 15/60
[52] U.S. Cl. .................................... 360/107; 360/102
[58] Field of Search ........ 360/107, 102, 130.21–130.24, 360/84–85

[56] References Cited

U.S. PATENT DOCUMENTS 3,981,024  9/1976  Mo et al. ...................... 360/130.24
4,031,558  6/1977  Kusada ........................... 360/130.24

FOREIGN PATENT DOCUMENTS

482803  12/1976  U.S.S.R. ............................ 360/107
531190   6/1977  U.S.S.R. ............................ 360/102

Primary Examiner—John H. Wolff
Attorney, Agent, or Firm—Burgess, Ryan and Wayne

[57] ABSTRACT

The present invention relates to a rotary head assembly for a magnetic recording and reproducing device such as VTR. A stationary center shaft is mounted on the side of a stationary cylinder while a rotary sleeve which is fitted over said stationary center shaft for rotation about the axis thereof is disposed on the side of a rotary cylinder. A lubricating oil is injected between the rotary sleeve and the stationary center shaft so that a space between the cylinders may be utilized so as to provide a hydraulic bearing portion. Thus, the rotary head assembly may be made compact in size and to a higher degree of accuracy. In addition, the thrust load carrying point of the hydraulic bearing portion is located on the side of the rotary cylinder, and the portion adjacent to the thrust load carrying point has a sealing arrangement or construction so as to prevent the leakage of lubricating oil and to stabilize the rotation of the rotary cylinder.

2 Claims, 7 Drawing Figures

ROTARY HEAD ASSEMBLY FOR MAGNETIC RECORDING AND REPRODUCING DEVICE

This is a continuation of application Ser. No. 4,564, filed Jan. 18, 1979 now U.S. Pat. No. 4,251,840.

BACKGROUND OF THE INVENTION

The present invention relates to a rotary head assembly for a magnetic recording and reproducing device or apparatus and more particularly to a rotation transmission means or device such as a rotary head cylinder assembly for video tape recorders (to be referred to as "VTR" for brevity in this specification) which requires a high speed and highly accurate transmission of rotation.

The problems imposed on the mechanical system, especially on the rotary head cylinder assembly of VTR are in general how to correctly maintain the relative speed and position between the head and the tape and how to reproduce. When there exist the variations in relative speed between the tape and head, the time axis of reproduced signal varies, causing the variations in hue and saturation of reproduced images and the horizontally off center raster. It follows therefor that the variations in relative speed must be reduced to a minimum.

In general, the rotation transmission devices must satisfy the following requirements:

1. the deviations in rotational speed must be reduced to a minimum; and
2. radial vibration also must be reduced to a minimum.

However, the prior art rotary head assemblies are in general such that the upper cylinder is supported by a pair of spaced rolling contact bearings. As a result, the variation in amount of lubricant (which is in general grease) sealed in the rolling-contact bearings and the methods for sealing the lubricant are immediately reflected in the variations in torque. That is, the variations in load are increased with increase in amount of lubricant, but when the lubricant is not sufficient, rapid wear results. Furthermore, unsatisfactory running accuracy of rolling-contact bearings also causes the variations in torque.

There has been an increasing demand for VTR which is both handy and portable. To this end, the rotary head assemblies must be made compact in size. Then, the inertia effect of the rotary head cylinder is reduced so that the variations in torque and consequently the variations in rotational speed result.

Vibration of the rotary head assembly is also caused by unsatisfactory running accuracy of rolling-contact bearings. Excessive play between mating parts also causes vibration. Because of vibration, the center or axis of rotation is deviated, resulting in the vibrations in rotational speed. As described above, the variations in rotational speed adversely affect the quality of reproduced images in the case of the rotary head assembly for VTR.

The problems of vibration and variations in rotational speed arise unavoidably as long as the rolling-contact bearings are used. Therefore there have been made various attempts to overcome these problems. For instance in order to reduce the vibration of the upper cylinder, the component parts of rolling contact bearings and rotary head assembly are machined and assembled at a higher degree of accuracy, and the moment of inertia of the rotary shaft is increased. However, the reduction in size of the rotary head assembly and hence VTR results in the decrease in flywheel effect of the upper cylinder. As a result, running accuracy of rolling contact bearings becomes more and more an important factor which affects vibration and variations in rotational speed of the upper cylinder.

Because of the disadvantages of the rolling contact bearings, there have been made various attempts to use pneumatic bearings in the rotary head assemblies for VTR especially for industrial or professional use. However, the penumatic bearings are disadvantageous in that it requires a pressurized air source; that is, an air compressor and a pneumatic control circuit which is very complicated in construction. Therefore, it is difficult at present to incorporate the pneumatic bearings in the rotary head assemblies for home VTR which must be made portable.

In addition to the problems of vibration and variations in rotational speed, the use of rolling contact bearings gives rise to another problem. That is, in order to provide portable VTR, the dimensions of VTR must be reduced as practically as possible. The height of portable VTR is dependent on the height of the rotary head assembly which in turn is dependent upon the distance between a pair of rolling contact bearings supporting the rotary shaft of the upper cylinder. Thus, as long as the rolling contact bearings are used in the rotary head assemblies in VTR, there exists a limit to the reduction in size of portable VTR.

SUMMARY OF THE INVENTION

Accordingly, one of the objects of the present invention is to provide a rotary head assembly for a magnetic recording and reproducing device which may ensure a higher degree of accuracy in rotation and may be made compact in size and simple in construction so as to facilitate the mass production of rotary head assemblies.

Briefly stated, to this end, the present invention provides a rotary head assembly for a magnetic recording and reproducing device of the type comprising a stationary center shaft one end of which is securely held in position, a stationary cylinder having a cylindrical surface coaxial with said stationary center shaft, a rotary cylinder disposed adjacent to one end of said stationary cylinder for rotation about the axis of said stationary center shaft and having a cylindrical surface coaxial and coplanar with that of said stationary cylinder, a means for driving said rotary cylinder, and a head mounted on said rotary cylinder in very closely spaced relationship with a tape which is threaded around said cylindrical surfaces of said stationary and rotary cylinders and transported relative thereto, characterized in that said stationary center shaft is held stationary relative to said stationary cylinder, said rotary cylinder is fitted over said stationary center shaft for rotation about the axis thereof, a rotary sleeve is fitted over said stationary cylinder and operatively connected to said driving means, a lubricating fluid is injected into the space between said rotary sleeve and said stationary center shaft so as to provide a hydraulic bearing means between said stationary and rotary cylinders, said hydraulic bearings means is sealed adjacent to its point carrying the thrust load, and said thrust load-carrying point is located within said rotary cylinder.

DESCRIPTION OF THE PREFERRED EMBODIMENTS

Figure 1:
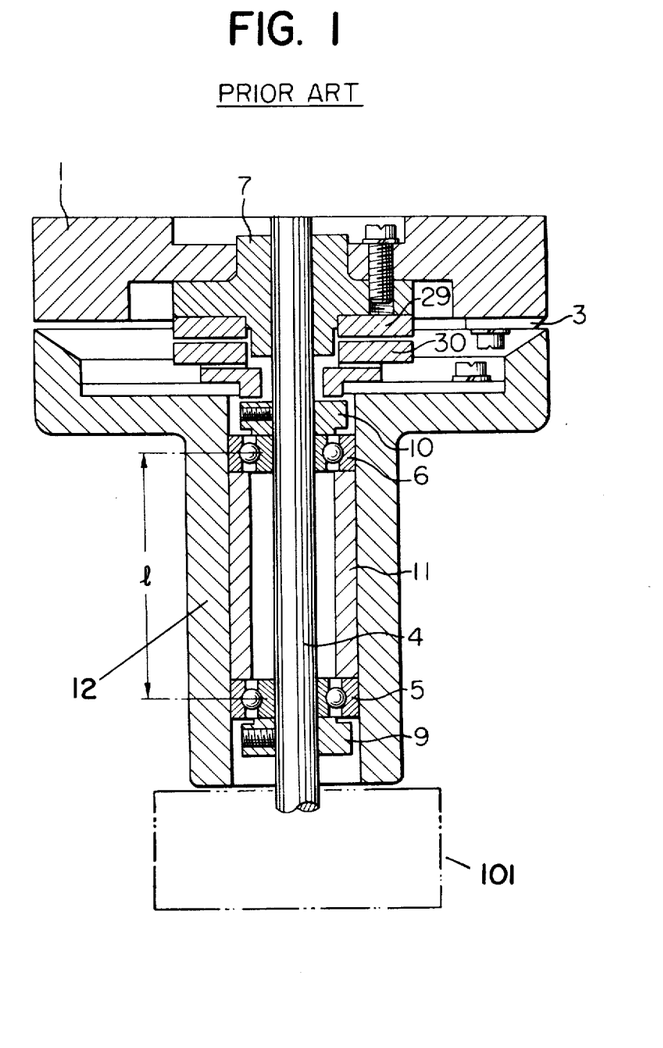
FIG. 1 is a schematic sectional view of a prior art VTR rotary head assembly.

Prior Art, FIG. 1

Prior to the description of the preferred embodiments of the present invention, a prior art VTR rotary head assembly will be described in order to more specifically point out the problems thereof.

Referring to FIG. 1, 1 denotes a rotary head cylinder (an upper cylinder) which is rotated at 1 800 rpm in case of the two-head helical scanning type VTR. A head 3 is mounted on the rotary head cylinder 1, and a rotary shaft 4 is supported by radial bearings 5 and 6 which receive both the radial and thrust loads. A bushing 7 is fitted over the rotary shaft 4 and is securely fitted into the rotary head cylinder 1. Sleeves 9, 10 and 11 are fitted over the rotary shaft 4 in such a way that they press against the radial bearings 5 and 6 so as to eliminate the axial displacement thereof.

The bearings 5 and 6 are housed within a housing 12.

The mounting of the cylinder of the type described above have the following problems.

(1) The quantity of a lubricating agent (grease) sealed in the ball bearings 5 and 6 and the method of sealing the lubricant result in the variations in torque. That is, a large quantity of lubricant or grease causes the wide variations in load while a small quantity of lubricant results in rapid wear. Furthermore, the undulations of the surfaces of the races of the bearings causes also the variations in torque.

Since the recent trend of the rotary head assemblies is toward the miniaturization, the inertia effect of the rotary cylinder head 1 is inevitably reduced so that the variations in rotation due to the variations in torque of the bearings present serious problems.

(2) Vibrations are mainly caused by the poor surface finish and inaccuracy of component parts such as balls and outer and inner races of the bearings, vibrations caused by the elasticity of the outer and inner races, and plays between the parts. Furthermore the lateral vibrations are associated with the variations in rotational speed due to the displacement of the center of rotation. Thus, the variations in rotational speed and vibrations adversely affect the quality of the pictures reproduced.

The above problems (1) and (2) arise inevitably because of the use of ball bearings. In the design of head assemblies, various efforts have been made so as to overcome these problems. For instance, in order to reduce the vibration of the cylinder to a minimum, the bearings and housings are machined with an extremely higher degree of accuracy and the rotary shafts are designed so as to produce a high moment of inertia. However, due to the recent trend toward the reduction in size of VTR mechanisms the flywheel effect of the cylinder is more and more decreased and the vibrations of bearings themselves present more and more serious problems.

In addition to the above described system for supporting the cylinder with bearings, the system for pneumatically supporting the cylinder has been devised and used in VTR for profession use. However, the pneumatic bearings need a compressor as a source of air under pressure and a pneumatic control circuit which is complicated in construction. Therefore, the adoption of this system in home VTR has been difficult because home VTR must be portable and simple in construction.

There has been an increasing demand for portable VTR so that the component parts must be fabricated at a higher degree of accuracy and assembled compact in size. The height of VTR, especially home VTR, is dependent upon the height of the cylinder which has the following problems.

(1) The upper cylinder 1 is of the cantilever construction so that in case of the exchange of the head 3, the upper cylinder 1 may be easily removed from the rotary shaft 4. Furthermore, if a bearing is disposed above the upper cylinder, the reduction in height of the upper cylinder cannot be attained.

(2) Two bearings are needed in order to support the rotary shaft. That is, in order to ensure the rigidity of the upper cylinder and the accuracy in rotation, two radial bearings are needed. It is preferable to increase the spacing (l in FIG. 1) between the bearings as practically as possible. As a result, the reduction in height becomes difficult.

In the case of the construction shown in FIG. 1, there are three ways for mounting a motor 101. That is, (1) the motor may be interposed between the upper cylinder 1 and the upper bearing 6;

(2) between the upper and lower bearings 6 and 5; and (3) below the lower bearing 5 (as actually shown in FIG. 1).

As shown in FIG. 1, it is preferable to locate rotary transformers 29 and 30, which operate on very weak head signals, as closely as practically possible to the undersurface of the upper cylinder 1.

However, when the motor is located between the upper cylinder 1 and the upper bearing 6, it must be positioned between the rotary transformer 30 and the upper bearing 6. As a result, the shaft for supporting the upper cylinder 1 in a cantilever manner is increased in length and consequently the rigidity of rotating parts decreases.

When the motor is interposed between the upper and lower ball bearings 5 and 6, separate housings must be provided. Furthermore, the alignment between the upper and lower rolling contact bearings 6 and 5 becomes extremely difficult.

When the DD motor is mounted below the lower bearing 5, the stationary part (stator) of the motor must be mounted on the lower end of the housing while the rotor (armature) must be rigidly connected to the rotary shaft 4. As a result, the over-all length of the upper cylinder assembly becomes larger so that it becomes difficult to make the upper cylinder assembly compact in size and light in weight.

In summary, with the constructions for supporting the upper cylinder 1 with the rolling contact bearings, it is difficult to make the upper cylinder assembly compact in size.

THE INVENTION

Figure 2:
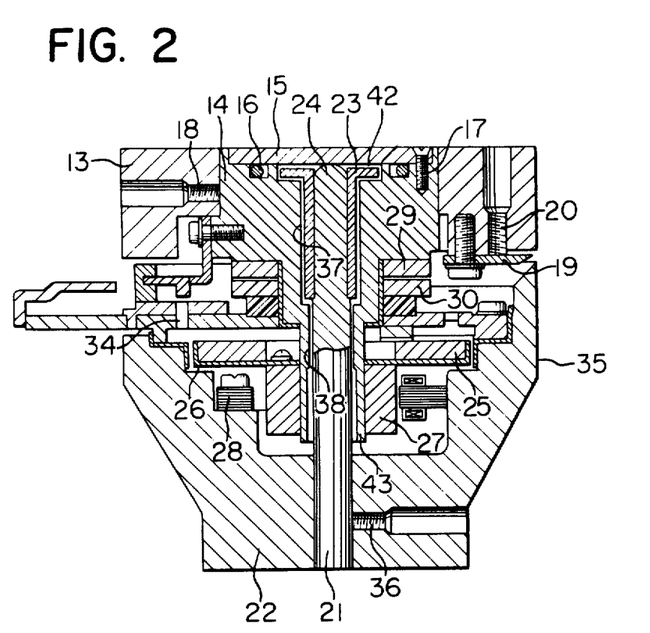
FIG. 2 is a schematic sectional view of a preferred embodiment of a VTR rotary head assembly in accordance with the present invention.

FIG. 2 shows a rotary head assembly in accordance with the present invention. It includes an upper cylinder 13, a rotary sleeve 14 and an upper cylinder cover 15 which define a housing for the rotating side of a hydraulic bearing. The upper cylinder cover 15 is securely mounted on the rotary sleeve 14 with bolts 17, and an oil ring 16 is interposed between them in order to prevent the leakage of a lubricant. The upper cylinder 13 is removably mounted on the rotary sleeve 14 with bolts 18.

A head 19 is mounted on the upper cylinder 13 in such a way that its extension and index angle may be fine adjusted by a head adjusting screw 20. A center stationary shaft 21 is supported in a lower housing 22.

A hydraulic bearing 23 is provided by fitting a spacer on the stationary shaft 21 inside the upper cylinder 13. The surfaces of the hydraulic bearing 23 are formed with spiral grooves by etching. The upper end of the stationary shaft 21 is terminated into a pivot pin 24.

A direct drive motor (DD motor) has an armature magnet 25 enclosed in a magnet case 26, a position rotor 27 and a position stator 28. The magnet case 26 is mounted on the position rotor 27 which in turn is operatively connected to the rotary sleeve 14. The position rotor 27 and position stator 28 correspond to brushes of the ordinary DC motors and have the function of detecting the angular position of the armature magnet 25 which is a rotor.

In order to detect the signals from the head 19, there are provided first and second rotary transformers 29 and 30. The rotary transformer 29 is mounted on the rotary sleeve 14 while the second rotary transformer 30 and its mounting ring 31 are mounted on a stationary member 32 and are securely bonded thereto with an adhesive.

The coil 34 of a pulse generator is mounted on the stationary member 32 so as to detect the angular position of the head 19. The center stationary shaft 21 is securely held in position by a setscrew 36 screwed into the housing 22 which has a lower cylinder portion 35.

In this specification, the space which is defined between the rotary sleeve 14 and the hydraulic bearing 23 and in which are formed oil films will be referred to as "the hydraulic lubricating portion 37" and the annular space which is defined between the rotary sleeve 14 and the stationary shaft 21 will be defined as "the lubricant leakage preventive portion 38". Since oil films are also formed in the lubricant leakage preventive portion 38 so as to effect the hydraulic lubrication between the rotary sleeve and the stationary shaft 21, there exists no definite boundary between the hydraulic lubricating portion 37 and the lubricant leakage preventive portion 38.

Figure 3:
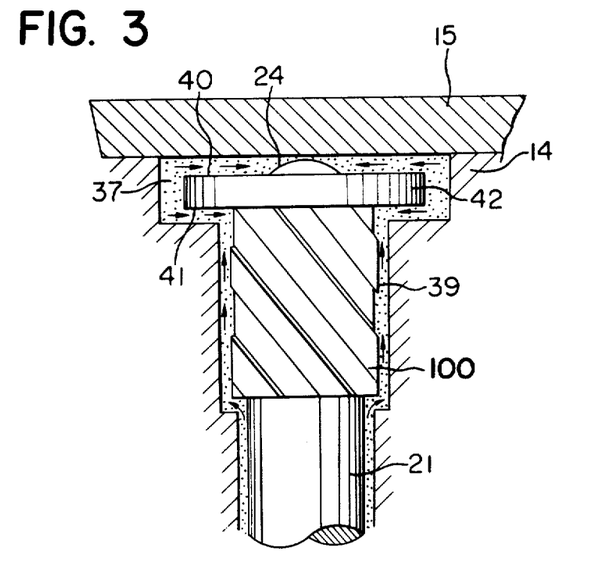
FIG. 3 is a fragmentary sectional view, on enlarged scale, thereof used for the explanation of the flow of a lubricating fluid sealed in a hydraulic bearing.

FIG. 3 shows, on enlarged scale, the spacer 100 of the hydraulic bearing. As described above, the outer surface of the spacer 100 is formed with radial spiral grooves 39. In addition, thrust spiral grooves are formed in the upper and lower surfaces 40 and 41 of a flanged disk 42 extended radially outwardly from the upper end of the spacer 23. Thus, the spacer 23 has a thrust bearing portion 42 and a radial bearing portion 43.

Upon rotation of the rotary sleeve 14, the inner wall surface or the moving all surface of the rotary sleeve 14 revolves around the outer wall surface of the stationary shaft 21 so that due to the wedge action of the lubricant film trapped between them and the pumping action of the hydraulic spiral bearing, the pressure is generated. That is, the lubricating liquid is exerted with the forces in the directions indicated by arrows in FIG. 3 under the pumping action because of the spiral grooves. However, when the pressure are brought into equilibrium, the flows of the lubricating oil in the directions indicated by the arrows will exist no longer and the lubricating liquid flows circumferentially.

The features, effects and advantages of the embodiment described above with reference to FIGS. 2 and 3 may be summarized as follows:

(1) The rotary head assembly may be made compact in size: That is, the feature of the present invention is the provision of a compact arrangement.

The tendency of VTR (especially home VTR) is toward the compactness, but as described above, the height of VTR is dependent upon that of the cylinder.

As described above, when the rolling contact bearings are used in the rotary head assemblies, there arise various problems. The present invention may substantially eliminate these problems.

For instance, in the preferred embodiment of the present invention shown in FIG. 2, the hydraulic bearing 23, which receives the thrust loads, is provided by the use of parts located within the upper cylinder 13.

As a result, not only there may be provided an excellent rigidity against the loads exerted to the upper cylinder 13 (against the weight of the upper cylinder when the tape tension is directed horizontally and the rotary head assembly is also held horizontally), but also the hydraulic bearing may be so advantageously constructed that the thickness of the upper cylinder and the rotary transformers 29 and 30 become thin. For instance, in the prior art rotary head assemblies, the rolling contact bearings occupy dead spaces, but according to the present invention, the over-all height of the cylinder assembly may be reduced at least by a degree equal to the over-all height of two rolling contact bearings.

The thrust bearing portion 42, which is only the portion of the stationary shaft 21 extended radially outwardly or enlarged in diameter, may be located within the upper portion of the rotary sleeve 14 which in turn is located within the upper cylinder 13. As a consequence, the rotary head assembly in accordance with the present invention may be made compact in size.

The upper portion of the rotary sleeve 14 is enlarged in outer diameter so as to removably mount the upper cylinder 1 thereon while the lower portion thereof is reduced in outer diameter so that component parts such as those of the DD motor may be mounted thereon.

In the prior art rotary head assemblies, wherein the upper cylinder is supported by the rolling contact bearings, the outer diameters of the bearings are large so that even when the stationary center shaft 21 is used, the diameter of the sleeve into which are mounted the rolling contact bearings becomes greater so that the mounting of component parts such as those of the DC motor becomes difficult.

However, when the hydraulic bearing construction as shown in FIG. 2 is employed, the wall thickness of the rotary sleeve 14 may be considerably reduced at the lower portion and the outer diameter may be also reduced. As a result, various component parts may be easily mounted on the rotary sleeve 14. In case of the VTR cylinder to which is applied the present invention and as shown in FIG. 1, the component parts of the VTR cylinder assembly may be arranged very compact in size without leaving any dead space. That is, there exists no loss span which corresponds to the distance l between the two rolling contact bearings shown in FIG. 1.

As compared with the prior art upper cylinder assembly as shown in FIG. 1, the over-all length of the upper cylinder assembly in accordance with the present invention may be reduced to one half when the DD motor same in capacity and dimensions to that mounted on the prior art upper cylinder assembly is mounted. That is,

|  | Prior Art | The Invention |
|---|---|---|
| Over-all length | L | 0.5 L |

(2) An extremely higher degree of accuracy in rotational speed may be ensured:

With the use of the upper cylinder assembly to which is applied the present invention as shown in FIG. 2, the rotary head assembly having an extremely higher degree of accuracy in rotational speed can be provided mainly because of the following three reasons:

(a) the use of the hydraulically lubricated bearing;

(b) the arrangement of the hydraulic bearing within the upper cylinder 13; and (c) the provision of the hydraulically lubricated bearing which may form oil films to a satisfactory degree. The above reasons will be described in more detail below.

(a) Under the pressures of the films of the liquid, both the rotary sleeve 14 and the upper cylinder 13 may be rotated about the axis of the stationary shaft 20 without any mechanical contact between them.

As a result, the present invention may overcome the problems inherent to the rolling contact bearings used in the prior art upper cylinder assemblies.

(b) In the device (FIG. 2), the hydraulic bearing is provided adjacent to the first and second rotary transformers 29 and 30 and to the upper cylinder 1 upon which is mounted the head 3 the accuracy of rotational speed of which must be highest. This arrangement will be described in more detail hereinafter.

Radial vibrations of the upper cylinder 13 and/or the eccentricity of the upper cylinder 13 from the stationary shaft 21 cause the variations in the relative speed between the head and the tape which in turn results in jitters in the reproduced images. The causes responsible to these phenomena are as follows:

(1) The upper cylinder 13 and other rotating parts are not balanced correctly or due to their eccentricity dynamic inequilibrium results.

(2) Eccentricity of rotating parts is caused by the tension of the tape.

(3) Oil whirls in the hydraulic bearing. How much these causes affect the radial vibrations and eccentricity closely depends upon the construction of the bearing which supports the rotating part.

In the case of the cause (1), the upper cylinder 13 serves as a flywheel which may damp high-frequency variations in rotational speed caused by torque ripples of the DD motor. The moment of rotation (as well as the weight and the radius of rotation) is greatest as compared with other rotating parts.

As a result, even an extremely small out of balance of the upper cylinder 13 and/or even a very small eccentricity thereof mostly cause the radial vibrations of the cylinder 13 and consequently the head 19 mounted thereon.

However, according to the preferred embodiment of the present invention, the hydraulic bearing may be located within the upper cylinder 13 as shown in FIG. 2 so that the centrifugal loads, which cause the unbalance described above, may be directly born. As a result, the moment load, which tends to cause the inclination of the axis of the rotary sleeve 14, will not exert on the hydraulically lubricating portion 37 within the upper cylinder 13. That is, an excellent dynamic equilibrium may be ensured and radial vibrations may be reduced to a minimum (so that variations in rotational speed may be also reduced to a minimum).

Same is true for the cause (2). That is, the hydraulic lubricating portion 37 may receive the tape tensions exerted to the upper cylinder 13 in such a way that no torsional moment may be produced. As a result, the rigidity of the bearing against the radial loads may be remarkably improved and the eccentricity of the center of rotation of the upper cylinder may be reduced to a minimum or a negligible degree.

As to the cause (3), oil whirls results in variations in rotational speed corresponding to one half of a rotational speed. This is an inherent instability that the hydraulic bearings exhibit.

In order to overcome this problem, non-circular bearings have been employed. The present invention also makes use of a spiral groove bearing which is one of the variations of the non-circular bearings.

Since, as shown in FIG. 2, the spiral groove bearing is located in opposed relationship with the inner wall of the upper cylinder 13 and with the first and second rotary transformers 29 and 30, the rigidity of the bearing due to the pumping action may be remarkably enhanced.

With the non-circular bearings such as spiral groove bearings (or the bearings with spiral grooves), the spring rigidity will not become zero even when the hyraulic bearing has no eccentricty because the pressure is produced so that the effects of the causes (1), (2) and (3) may be by far reduced.

Furthermore, the provision of the pivot bearing at the upper end of the stationary shaft 21 serves to reduce the torque when the driving of the upper cylinder is started.

(c) The hydraulically lubricated bearing which may sufficient oil films may be provided.

When a predetermined volume of lubricating oil is sealed in a hydraulic bearing in order to enhance the portability of an equipment, it is difficult to attain the formation of ideal oil films because of the leakage of the lubricating oil, the air entrapped in the oil and so on except the lubrication systems wherein the lubricating oil is forced to circulate from the exterior.

According to the present invention, however, the lubricating oil is always exposed to the surrounding atmosphere at the lower end of the upper cylinder assembly; that is, the open end 43 of the rotary sleeve 14. The most tightly sealed portion is located within the upper cylinder 13 in which is provided the hydraulic bearing 23 and is farthest from the opening 43.

In the device of the present invention, the sufficient hydraulic lubrication may be attained over the inner wall surfaces of the upper cylinder 13.

When the direct drive motor as shown in FIG. 2 is used in the device of the present invention, the accuracy in rotational speed may be further improved.

The reason is that the direct drive system which exerts no radial load due to the belt tension as in the belt drive system will not cause any eccentricity of the hydraulic bearing.

Meanwhile, in this specification, the portion where the hydraulic bearings is provided or otherwise formed refers to the portion where the film of lubricating oil is formed.

For instance, in FIG. 2, the upper end of the pivot bearing 24 is the upper limit of the hydraulic bearing. Due to the wedge action of the viscous liquid, the hydraulic bearing is formed at the leakage preventive portion 38.

The portions adjacent to the open end of the rotary sleeve 14 are in contact with the surrounding atmosphere so that the transition to semifluid and to boundary lubrication occurs, but there exists no definite boundary between the complete fluid-film or hydrodynamic lubrication described above and the boundary lubrication.

According to the present invention, when the leading end of the pivot bearing 24 is located within the inner walls of the first and second rotary transformers 29 and 30, sufficiently high rigidity and accuracy may be attained.

(3) Excellent Oil Sealability:

One of the difficult problems encountered in the mounting of the hydraulic bearings (especially oil bearings) is how to seal the lubricant.

In case of the machine tools, the exchange and/or replenishment of lubricant may be made at any time. However, in case of portable electrical equipment such as cylinder assemblies of VTR readily available in the market, it is preferable to seal the lubricating oil in such a way that no supply may be required.

Especially in case of the upper cylinder assemblies of VTR, which is a preferred embodiment of the present invention, the contamination of component parts from the lubricating oil must be completely avoided.

When even an extremely small quantity of oil adheres to the head 19 and the tape, dust or the like is attracted and adheres to the oil. As a result, the misinterpretation of the head signals results.

The result is a partial disappearance of the FM carrier, causing drop-out noise. When the leakage of oil causes the entrainment of air into the hydraulically lubricated bearing portion, the accuracy in the rotational speed of the hydraulic bearing is adversely affected.

When the hyraulic bearings are applied to the devices and equipment such as VTR cylinders which require a higher degree of accuracy in rotational speed, the entrainment of air into the hyraulically lubricated portion causes a remarkable increase in oil whirl and a considerable increase in rigidity of the bearing. This fact has been confirmed by the extensive studies and experiments conducted by the inventors. Oil whirls causes radial vibrations and variations in rotational speed of the upper cylinder, the frequency of these vibrations and variations being one half of a rotational speed of the upper cylinder. The decrease in rigidity of the bearing causes radial vibrations whose frequency is almost equal to a rotational speed and the degradation of various characteristics of the device due to the deviation from a correct position.

According to the preferred embodiment of the present invention, the fact that the radial loads of VTR cylinders (especially for home VTR) are small is utilized so that the present invention has succeeded in providing an excellent construction of hydraulic bearing which may ensure the complete prevention of oil leakage for a long time.

For instance, the radial load due to the tape tension in VTR, which is a preferred embodiment of the present invention, is of the order of 50 grams at the most, which is extremely low as compared with other hydraulic bearings.

As a result, it may be said that this is a condition under which the flow to the exterior of the lubricating oil due to the pressure, which is generated in order to establish an equilibrium with an external load, may be easily prevented.

In addition, because of the reasons to be described below, the present invention may attain a higher degree of oil sealability. (i) As is clear from FIG. 2, the rotary sleeve 14, which is formed or otherwise made integral with the upper cylinder 13 is in the form of an axially elongated pipe so that the leakage preventive portion 38; that is, an oil flow passage for preventing the leakage through the clearance between the rotary sleeve 14 and the stationary shaft 21 may be extended lengthwise over a sufficiently long length.

The lubricating oil is charged into the spaced or clearance between the rotary sleeve 14 and the stationary shaft 21 and into the hydraulic bearing 23 before the cover 15 is mounted on the upper cylinder 13.

Because of higher resistance to the flow of lubricating oil and the surface tension provided by the oil packing 16 at the upper portion and between the rotary sleeve 14 and the stationary shaft 21 at the lower portion, the oil leakage may be prevented.

The construction in accordance with the present invention ensures a higher degree of sealability of lubricating oil so that even an oil with a low viscosity may be completely sealed.

Furthermore, since it suffices to charge the lubricating oil through the upper cylinder at a single position, the assembly and maintenance may be much facilitated. (ii) The upper portion (that is, the upper cylinder cover 15) of the rotary sleeve 14 which is most closely located to the head 19 and the tape may be completely sealed by a pressure-fitted type (contact type) seal such as the oil packing 16 so that the leakage of oil after it has been charged may be avoided completely. The lower open end 43 of the hydraulic bearing in accordance with the present invention is spaced apart from the upper cylinder 13 through the component parts 25, 26 and 27 of the DD motor by a relatively long distance, the upward spread of contamination may be substantially eliminated even when the lubricating oil leaks in a small quantity from the open end 43.

As a consequence, the component parts such as the head 19, the upper cylinder 13 and so on of the tape threading system may be maintained in clean environments.

In the preferred embodiment of the present invention, in order to reduce the torque of the driving part and to minimize the variations in load due to the variations in environmental temperature, a low volatile and low viscosity ester oil ($\eta = 30$ cst at 30° C.) was used, but no leakage was observed at all over a long operating time interval.

The thrust bearing portion 42 and the upper cylinder cover 15 define a hydraulic thrust bearing between them. Since a sufficient space is available in the vicinity of the hydraulic thrust bearing thus defined, an excellent construction for sealing the lubricating oil may be provided. That is, the cover 15 is securely attached through the oil packing 16 to the rotary sleeve 14 with the bolts 17.

With this arrangement, even after the assembly, the upper cylinder 13 may be easily removed from the rotary sleeve 14 (in the direction indicated by the arrow shown in FIG. 2) by loosening the setscrews 13 which joins between the upper cylinder 13 and the rotary sleeve 14. Therefore the exchange of the head 19 may be much facilitated. (After the use of the head for a predetermined time interval, it must be exchanged because of its wear.)

The stationary shaft 21, the rotary sleeve 14 and the upper cover 15 may be handled as a unit so that the lubricating oil may be poured into the hydraulic bearing without causing any contamination of other component parts with the lubricating oil. Furthermore, the assembly may be simplified.

Because of the reasons (1), (2) and (3) described above, the upper cylinder assembly for VTR which may ensure the completely tight sealing of lubricating oil and the higher accuracy in operation and may be made compact in size may be provided.

In addition to the advantages (1), (2) and (3) described above, the present invention is further advantageous the upper cylinder assemblies may be easily machined and assembled.

For instance, in the prior art upper cylinder assemblies wherein the upper cylinder is supported by the rolling contact bearings, various problems arise when the rotating part or the upper cylinder must be rotated at a higher degree of mechanical accuracy. In case of the upper cylinder assembly shown in FIG. 1, in order to align the rolling contact bearings 5 and 6, one bearing is first mounted on the housing 12 and then the outer race of the other bearing must be securely bonded to the housing with a suitable adhesive.

Furthermore, in order to secure a correct coaxial relationship between the upper cylinder and the rotary shaft 4 or to correctly maintain the upper surface of the upper cylinder at right angles to the axis of the rotary shaft 4, a step is required for machining the bushing 7, upon which is mounted the upper cylinder 1, after they have been assembled. This step is cumbersome and is an obstacle to the mass production of the upper cylinder assemblies. However, the upper cylinder assemblies incorporating the hydraulic bearings in accordance with the present invention may substantially overcome these problems.

That is, when the component parts are fabricated with required dimensional tolerances or accuracies, the oil film which is formed uniformly in the clearance between the rotary sleeve 14 and the stationary shaft 21 may automatically attain the correct coaxial relationship between them. According to the present invention, the hydraulic bearing is constituted by a pair of component elements; that is, the rotary sleeve 14 and the stationary shaft 21 so that opposed to the prior art upper cylinder assemblies of the type shown in FIG. 1 the alignment between two rolling contact bearings 5 and 6 may be eliminated.

Furthermore, the present invention may reduce the number of component parts of the upper cylinder assembly for VTR to a minimum. For instance, the sleeves 9, 10 and 11 which cannot be eliminated for mounting the rolling contact bearings 5 and 6 in the prior art upper cylinder assembly shown in FIG. 1 may be completely eliminated.

So far the fundamental features of the construction of the upper cylinder assembly for VTR to which is applied the present invention has been described, and the present invention may be equally applied to various fields as will be described below.

Figure 4:
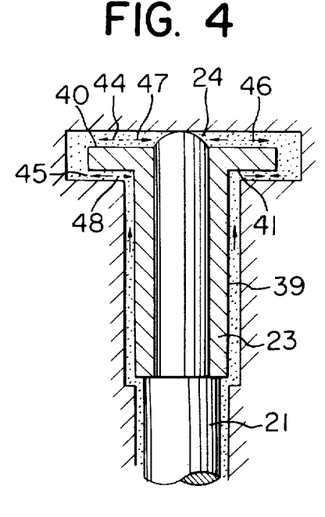
FIG. 4 is a view used for the explanation of a pivot bearing for carrying the thrust load.

FIG. 4 shows a construction of a bearing wherein the leading end of the pivot bearing 24 is always pressed against the upper cylinder 15 so as to control the position thereof in the direction in which the thrust load is exerted.

The arrows shown in FIG. 4 show the forces exerted to the liquid when the present invention is applied in various modes. For instance, (1) in case of the pivot suction type (A), the thrust load carrying surface 40 is formed with spiral grooves in such a manner that the liquid is exerted with the force indicated by the arrow 44.

The thrust carrying surface 41 is not needed to be formed with spiral grooves. The clearance 45 must be sufficiently made large while the clearance 46 must be made small.

According to this system, a negative pressure is produced in the clearance 46 so that the upper cylinder 13 (the upper cylinder cover 15) is forced to press against the pivot bearing 24 because of the difference between the negative pressure in the clearance 46 and the atmospheric pressure. The greater the area of the thrust load carrying surface 41, the greater the suction force becomes.

(2) In the case of the pivot suction type (B):

The thrust load carrying surfaces 40 and 41 are formed with spiral grooves in such a way that the liquid is exerted with the forces in the directions indicated by the arrows 47 and 48.

The dimensions of the bearing must be so determined that the clearance 45 may be made as small as possible while the clearance 46 may be made as large as possible. The pressure acting on the thrust load carrrying surface 41 is greater than that acting on the thrust load carrying surface 40 so that the upper cylinder is exerted with the force which is directed downwards. That is, the pivot bearing 24 and the upper cylinder 15 are pressed against each other. In both the cases (A) and (B), the pivot bearing 24 may carry the thrust load.

Instead of forming the spiral grooves in the thrust load carrying surface 41, circumferential steps may be formed.

When either of the method (A) or (B) is employed, the height of the upper cylinder 13; that is, the height of the head 19 may be determined mechanically from the height of the leading or upper end of the pivot bearing 24. Therefore, in the case of the adjustment of the height of the head (that is, the position in the axial direction relative to the tape) during the assembly, it is not required to take the thickness of oil film into consideration. Thus the adjustment is much facilitated. There has been proposed a method wherein the positive pressures are produced in the clearances above and below the thrust bearing 42 so that the pivot bearing 24 is supported in a non-contact manner and the upper and lower pressures are balanced so as to support the shaft in two directions (upper and lower directions). As compared with this arrangement, severe dimensional tolerances of the upper and lower clearances 45 and 46 and the thickness of the thrust bearing are not needed.

In the cases of (A) and (B), only the tip of the pivot bearing 24 is made into mechanical contact with the upper cylinder or upper cylinder cover. Since this is a point contact, an extremely higher degree of accuracy in rotational speed may be attained.

The construction of the thrust bearing in accordance with the present invention is such that the pivot bearing 24 carries the external load acting downwards on the upper cylinder and the hydraulic bearing carries the external load acting upwards on the upper cylinder. That is, the bearing carries the loads acting in two directions.

In addition, the pivot suction systems (A) and (b) have a further advantage in that they may be used even when the device in accordance with the present invention is maintained in a horizontal position or in an inverted position.

For instance, in the case of the method wherein the positive pressures are generated in the upper and lower clearances of a thrust bearing 42, thereby maintaining the rotating part in equilibrium, the equilibrium between the forces is established by the weight of the rotating part, the pressure produced in the area 45 below the thrust bearing 42 and the pressure produced in the area 46 above the thrust bearing 42 so that the axial position of the rotating part (and the height of the head 19) is determined.

However, when the device is maintained in an inverted position or is turned upside down, the direction of the load acting on the rotating part remains unchanged so that the equilibrium position supported by the film of oil changes.

However, when the pivot suction systems (A) and (b) are employed, the thrust bearing may be so arranged that the suction force to the pivot surface (the vertical resistance from the upper cylinder 15) may become greater than the load acting on the rotating part so that the pivot bearing surface may be always maintained sucked to the upper cylinder cover 15 regardless of the position of the deivce. Thus, a high rigidity in the axial direction may be attained. As a result, the absolute height of the head 19 remains unchanged.

The greater the diameter of the flange of the thrust bearing 42, the greater the suction force of the pivot bearing 24. In the cylinder construction in accordance with the present invention, the diameter of the flange may be sufficiently increased by the effective use of the portion above the upper surface of the upper cylinder 13 which is a dead space. Thus the compactness of the device is not lost.

The method of the present invention is effective or advantages especially in the case wherein the upper cylinder assembly for VTR wherein the accuracy of the height of the head 19 must be less than a few microns is applied to a portable VTR whose position always changes.

In the preferred embodiment of the present invention, that is, in the case of the pivot suction system (A), the depth of the spiral grooves as well as the thrust clearance were 25μ and the thrust diameter was 15 mm. A suitable suction force of F=400 grams was obtained. This, even when the device was maintained in an inverted position, the sufficient use was permitted (the satisfactory operations were ensured).

The leading end of the pivot bearing which was used in the preferred embodiment and which is a supporting member, is in the form of a sphere so that the contact portion becomes a point contact, whereby the torque may be decreased.

Furthermore, the supporting member may be formed with a combination of, for instance, a conical surface, a groove V-shaped in cross section, a sphere of a small diameter and a plane.

In the preferred embodiment of the present invention, the thrust bearing 42 is formed at the upper end of the stationary shaft 21 so that the present invention has succeeded to provide the construction which may make full effective use of a portion located inside the inner wall of the upper cylinder 13 without any waste in space.

The thrust bearing 42 with the above construction has the following effects, features and advantages:

(i) The precession may be prevented.

(ii) The function as an axial stopper when the upper cylinder 13 is removed in case of the exchange of the head 19 and the assembly of the device.

When the unbalanced quantity of the rotating part exists, the precession results. When the pivot suction system is for instance employed, the leading end of the pivot bearing 24 formed at the leading end of the stationary shaft 21 becomes a pivot of precession.

The device of the present invention is featured in that the variations in the position of the head 19 due to the precession may be reduced to a minimum.

One of the reasons is the position of the pivotal point.

Let the axis of the stationary shaft 21 be the Z-axis and let construct the X- and Y-axes in the plane perpendicular to the Z-axis and containing the pivotal point which is the origin. According to the present invention, the moments about the X- and Y-axes may be reduced to a minimum.

The smaller the moments about the X- and Y-axes, the smaller the inclination (of the pivot) to the vertical becomes. The relation between the precession and the pivotal point may be intuitively understood when one compares a top with a high center of gravity with a top with a low center of gravity. The construction of the device in accordance with the present invention corresponds to that of a top with a low center of gravity which is stable.

In the device of the present invention, the pivotal point of rotation may be located within the upper cylinder. In addition, the thrust bearing 42 which is located adjacent to the pivotal point has the action of compensating the inclination of the axis of the rotating member so that the precession may be effectively prevented and consequently the variations in position of the head 19 may be reduced to a minimum. The flange of the thrust bearing 42 has a function of a stopper between the rotating member and the stationary member (the stationary shaft 21) in the case of the exchange of the upper cylinder 13.

Figure 5:
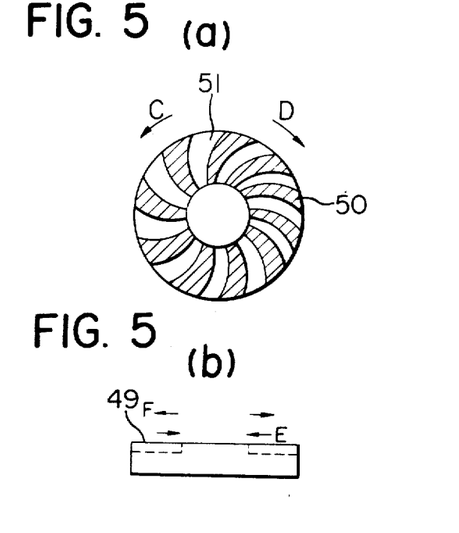
FIG. 5(a) is a top view of a grooved plain bearing.
FIG. 5(b) is a side view thereof.

FIG. 5 shows a thrust spiral groove plain bearing.

A flat surface 49 is formed with alternative grooves 50 and ridges 51 which are equiangularly spaced apart from each other.

When the thrust bearing rotates in the direction indicated by the arrow D, the lubricating liquid on the thrust flat surface 49 is exerted with the force which causes the lubricating fluid to flow in the direction indicated by the arrow E.

On the other hand, when the thrust bearing rotates in the direction C, the lubricating fluid is exerted with the force in the direction F.

If the thrust plain bearing is held stationary while a surface in opposed relationship with the flat surface 49 rotates, the direction of the force acting on the fluid is reversed entirely.

Same is true for the radial spiral groove bearings.

The ridges and grooves of the spiral grooves may be defined by logarithmic spirals or the like. The effects of the pumping and wedge actions of the fluid bearings may be equally attained by the use of other curves or straight lines.

Therefore, the term "spiral grooves" may interchangeably refer to "any suitable groove shapes adapted to produce both the pumping and wedge actions" in this specification.

The grooves used in the hydraulic bearings are provided in order to attain a higher degree of hydraulic lubrication. Of course, even without the provision of grooves, the construction of the cylinder of the present invention may attain sufficient effects of hydraulic lubrication.

In addition to the spirally grooved bearings which are imperfectly round, there are multi-arc bearings, stepped bearings and so on. They may be applied to the present invention in order to attain effective hydraulic lubrication.

For instance, a multi-arc bearing may be formed at the radial bearing portion 39 shown in FIG. 3 and stepped bearings may be formed at the upper and lower surfaces of the thrust bearing.

Figure 6:
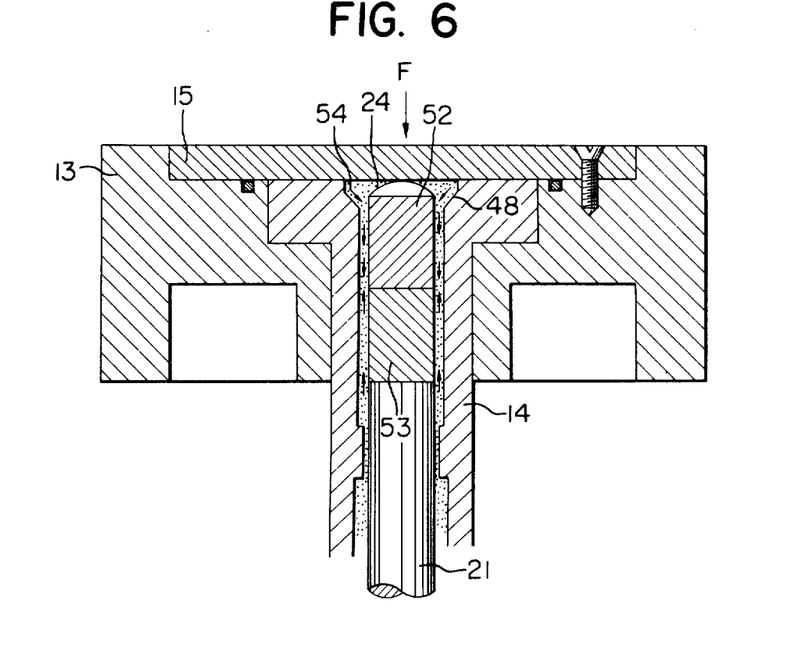
FIG. 6 shows another embodiment of the present invention wherein the stationary shaft is not formed with a flange but is formed with oil grooves so that the lubricating oil may carry thrust loads.

FIG. 6 shows one of the preferred embodiments or applications of the present invention. This is the preferred embodiment wherein the construction is further made compact and the pivot bearing carries the thrust load acting on the upper cylinder 13.

52 is a radial spiral bearing a; 53, a radial spiral bearing b; 54, a clearance; and 48, a beveled portion. The radial bearings a and b are directly formed in the stationary shaft 21 in such a way that the spiral grooves are opposite in direction. Due to the pumping action of the spiral grooves, the lubricating oil is exerted with the force indicated by the arrow in FIG. 6.

As a result, a negative pressure is produced in the clearance 54 so as to establish the pressure equilibrium in such a way that the fluid which tends to flow in the direction indicated by the arrow may be retracted.

Since a negative pressure is generated in the clearance 54, the upper cylinder is exerted with the force in the direction F in FIG. 6 due to the difference between the atmospheric pressure and the negative pressure in the clearance 54, and this force balances the vertical resistance from a point on the pivot bearing 24.

Thus, the upper cylinder receives a thrust support and may revolve about the stationary shaft 21 in a stabilized manner. In this case, a spherical projection may be formed at a portion of the upper cylinder 15 in opposed relation with the stationary shaft 21, thereby providing a pivot bearing.

When this method is employed, the construction may be made extremely compact. Opposed to the rolling contact bearings wherein contacts occur at many points, the pivot bearing 24 which may maintain a point contact may ensure an extremely higher degree of accuracy in rotational speed.

The most serious inherent problem of the pivot bearings is that it is difficult to carry the thrust loads in both directions. (It cannot satisfactorily carry the thrust loads acting in both axial directions.) They can control only the direction of the thrust load under the weight of a rotating part.

However, when the method described above is employed, even if the upper cylinder 13 is deviated a very small distance upwardly of the pivot bearing 24, the returning force which is proportional (in magnitude) to the displacement of the upper cylinder acts so that an extremely stabilized dynamic equilibrium may be maintained.

Figure 7:
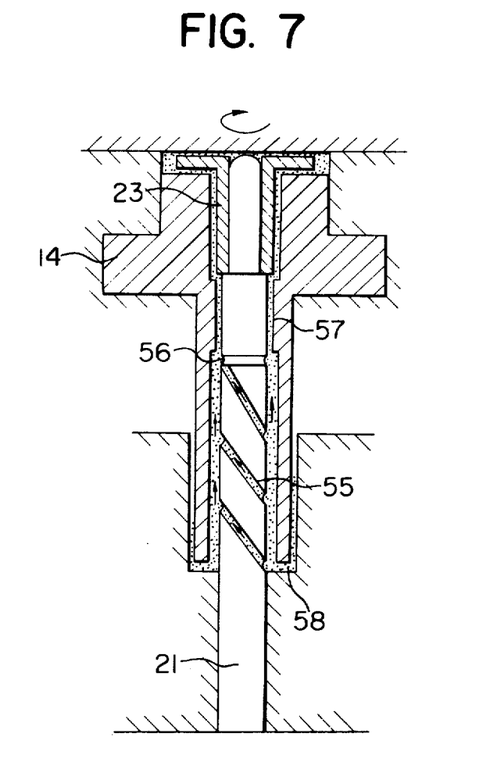
FIG. 7 shows a further embodiment of the present invention which is provided with means for preventing the leakage of lubricant.

FIG. 7 shows a further embodiment of the present invention which may ensure a more secure and tight sealing of lubricating oil. The stationary shaft 21 is formed with spiral grooves 55 and an annular groove 56 which serves as an oil reservoir. A clearance 57 between the stationary shaft 21 above its annular groove 56 and the rotary sleeve 14 serves as a sealing portion. As the rotary sleeve 14 is rotated, the lubricant is pumped up from the oil bottom 58 along the spiral grooves 55, whereby the leakage of the lubricant may be prevented.

The effects, features and advantages of the present invention may be summarized as follows:

(1) The rotary head assembly of the present invention may ensure a higher degree of accuracy in rotational speed.

As described hereinbefore, the present invention makes full use of the advantages of hydraulic lubrication. As a result, both the radial and thrust loads acting on the upper cylinder of the rotary head assembly may be carried by the hydraulic bearing in an almost ideal manner hitherto unattainable by the prior art. In addition, a higher degree of accuracy in rotational speed of the upper cylinder may be ensured. Thus, the present invention may substantially overcome the problems encountered in the prior art rotary head assemblies wherein the upper cylinder is supported by the rolling-contact bearings. Consequently, the performance of VTR incorporating the rotary head assembly of the present invention may be remarkably improved.

(2) The rotary head assembly of the present invention may be made very compact in size.

The main reason is that the rotary sleeve upon which is mounted the upper cylinder is rotatably mounted through the hydraulic bearing on the stationary shaft. The fact that the rotary sleeve is in the form of a pipe also contributes to the reduction in size of the rotary head assembly. The use of the hydraulic bearing can completely eliminate the use of rolling-contact bearings which have been long used in the prior art rotary head assemblies and which require a large installation space. Thus, according to the present invention VTR with an extremely thin thickness hitherto unattainable by the prior art may be provided.

(3) The mass production may be much facilitated.

The greatest obstacle to the mass production of VTR has been the machining and assembly of the upper cylinder assemblies or the rotary head assemblies which must be machined and assembled with a higher degree of dimensional accuracy. So far with the use of rolling-contact bearings, it has been impossible to improve the dimensional accuracies beyond certain limits. Since the present invention may completely eliminate the use of rolling contact bearings, these problems may be overcomed. Thus, the mass production may be facilitated. Furthermore, the component parts may be machined or otherwise fabricated at low cost. The sealing of lubricant may be remarkably improved.

In addition to VTR, the present invention may be equally applied to various electrical and electronic devices and equipment such as tape decks, players, video disks, magnetic drum devices for industrial use, sheet disk recording and reproducing devices and so on, all of which require rotating members which must rotate at a higher degree of accuracy in rotational speed for a long service time.

What is claimed is:

1. A rotary head assembly for a magnetic recording and reproducing device, comprising:
   a stationary center shaft having one end which is securely held in position and a free end, with a flange adjacent said free end;
   a stationary cylinder having a cylindrical surface coaxial with said stationary center shaft;
   a rotary cylinder disposed adjacent to one end of said stationary cylinder for rotation about the axis of said stationary center shaft and having a cylindrical surface the diameter of which is the same as that of said cylindrical surface of said stationary cylinder, said rotary cylinder having an axial cylindrical recess therein, said recess including a shoulder portion for receiving said flange;
   means for driving said rotary cylinder;
   a magnetic head mounted on said rotary cylinder;
   said stationary center shaft being stationary relative to said stationary cylinder, the free end of said stationary center shaft extending into said cylindrical recess for supporting said rotary cylinder, said free end having a region of engagement with the bottom of said recess which has an area substantially less than the cross sectional area of said shaft;
   said rotary cylinder including a rotary sleeve having a sealed upper end defining the bottom of said recess and an open lower end;
   a lubricating fluid disposed in the space between said rotary sleeve and said stationary center shaft so as to provide a hydraulic bearing means between said stationary center shaft and rotary cylinder, said hydraulic bearing means having (i) a radial bearing portion defined by a peripheral surface part of said shaft adjacent said flange and relatively remote from said free end, and the adjacent inner surface part of said rotary sleeve, one of said surface parts having a circumferential spiral or helical groove therein for subjecting said fluid to a pumping effect upon rotation of said rotary sleeve; and (ii) a thrust bearing portion defined by said shoulder portion and the adjacent major surface of said flange.

2. A rotary head assembly for a magnetic recording and reproducing device, comprising:
   a stationary center shaft having one end which is securely held in position and a free end, with a flange adjacent said free end;
   a stationary cylinder having a cylindrical surface coaxial with said stationary center shaft;
   a rotary cylinder disposed adjacent to one end of said stationary cylinder for rotation about the axis of said stationary center shaft and having a cylindrical surface the diameter of which is the same as that of said cylindrical surface of said stationary cylinder, said rotary cylinder having an axial cylindrical recess therein, said recess including a shoulder portion for receiving said flange;
   means for driving said rotary cylinder;
   a magnetic head mounted on said rotary cylinder;
   said stationary center shaft being stationary relative to said stationary cylinder, the free end of said stationary center shaft extending into said cylindrical recess for supporting said rotary cylinder, said free end having a region of engagement with the bottom of said recess which has an area substantially less than the cross sectional area of said shaft;
   said rotary cylinder including a rotary sleeve having a sealed upper end defining the bottom of said recess and an open lower end;
   a lubricating fluid disposed in the space between said rotary sleeve and said stationary center shaft so as to provide a hydraulic bearing means between said stationary center shaft and rotary cylinder, said hydraulic bearing means having (i) a radial bearing portion defined by a peripheral surface part of said shaft adjacent said flange and relatively remote from said free end, and the adjacent inner surface part of said rotary sleeve, one of said surface parts having at least one non-circular bearing therein for subjecting said fluid to a pumping effect and/or wedge action upon rotation of said rotary sleeve; and (ii) a thrust bearing portion defined by said shoulder portion and the adjacent major surface of said flange.

* * * * *